United States Patent [19]

Collins

[11] 4,031,591
[45] June 28, 1977

[54] STUNNING METHODS AND APPARATUS

[75] Inventor: John Joseph Collins, Sudbury, England

[73] Assignee: Haverhill Meat Products Limited, Suffolk, England

[22] Filed: Apr. 21, 1976

[21] Appl. No.: 679,047

Related U.S. Application Data

[63] Continuation-in-part of Ser. No. 514,601, Oct. 15, 1974, abandoned.

[30] Foreign Application Priority Data

Oct. 23, 1973 United Kingdom ............ 49348/73

[52] U.S. Cl. .................................................. 17/1 E
[51] Int. Cl.² ......................................... A22B 3/00
[58] Field of Search ............. 17/1 E, 1 B; 231/2 E; 43/17.1

[56] References Cited

UNITED STATES PATENTS

| 910,775 | 1/1909 | Bergh ..................................... 17/1 B |
| 3,110,925 | 11/1963 | McMath et al. ....................... 17/1 E |
| 3,163,884 | 1/1965 | Dunaway .............................. 17/1 E |

FOREIGN PATENTS OR APPLICATIONS 364,386   1/1932   United Kingdom ................. 17/1 E Primary Examiner—Warner H. Camp
Attorney, Agent, or Firm—Burns, Doane, Swecker & Mathis

[57] ABSTRACT

A stunning tongs for stunning animals prior to slaughter comprising a frame having a handle portion and a pair of stunning arms mounted thereon to permit relative movement between the arms, stunning electrode heads on the arms, a prime mover operable to effect rapid relative movement between the arms to impart a stunning blow on opposite sides of the animal's head, and an electronic stunning circuit operable in timed relation to the prime mover to pass an impulse of predetermined waveform frequency and voltage current for a predetermined time period between the stunning heads through the animal's head coterminous with the stunning blow. A manually actuable control switch is provided to supply actuating energy from an energy source simultaneously to the prime mover and the stunning circuit.

16 Claims, 4 Drawing Figures

STUNNING METHODS AND APPARATUS

RELATED APPLICATION

This application is a continuation-in-part of application Ser. No. 514,601 filed Oct. 15, 1974 and now abandoned.

BACKGROUND OF THE INVENTION

This invention relates to stunning tongs for use in abattoirs for stunning animals prior to slaughtering them by any conventional methods such as bleeding as by cutting the throat or humane killer slaughter.

The stunning tongs of the present invention, while applicable for use with other animals such as sheep and cattle, are primarily for stunning pigs, and for doing so prior to slaughter. The slaughter of a pig is a specialized operation different from the slaughter of other animals in that the corpse should be drained rapidly of all blood immediately on slaughter to obtain the desired meat condition.

Slaughter is effected by suspending the animal by its hind legs and severing blood vessels in its throat to release the blood. It is desirable that the heart be beating at that time so that it pumps blood quickly out of the body. During this bleeding operation it is desirable for the body to be completely relaxed and without nervous tension. Otherwise the body would be stiffened by the muscles being in tension and might kick violently even though lifeless. This would cause blood clots and would also cause splashing of the blood from the body, and hence there would not be a steady quick drain of the blood from the body which is important if the meat is to be of high quality.

It would additionally be desirable that the body not bleed from any other point than the throat, especially not from the head, because too slow a bleeding flow would be established and blood splashing would result.

From the foregoing it will be apparent that the aniamal must be alive and relaxed at slaughter. However, for humane reasons, it must be completely insensible so that it will not suffer.

Stunning tongs are known (see U.K. Specification Pat. No. 364,386) comprising a pair of stunning arms carrying stunning heads and pivoted together to enable the arms to be spread apart to embrace any part of the head area of the animal and apply pressure thereto, the arms having handles for manual manipulation enabling the stunning heads to be engaged on either side of the animal's head. When the stunning heads are engaged on the animal's head an electric impulse is passed between them to stun the animal.

Such known stunning tongs are difficult to operate as well as being time consuming in use and the electric impulse is selected at random so that the tongs are not as efficacious as is desirable for satisfactory humane slaughter of animals.

It has been found that to achieve a satisfactory body state after stunning and before slaughter there is an optimum relationship between the firm contact of the stunning arms on the animal's head and the waveform/frequency and voltage/current of the electric impulse at the moment of impact as well as the time period of the application of the tongs on the head and the impulse in order effectively to stun the animal.

In the case of the apparatus of U.K. Specification Pat. No. 364,386 a harness is produced for application to the head of the animal. The harness works on the basis of the electrodes being pressed manually against the animal's head so that thereafter an electric charge or impulse can be passed through the animal's head to effect a stun and the kill. The harness itself is hand operated so that during application of the harness the animal becomes aware of what is being done and thus it subjects the animal to distress and tension prior to stunning or slaughter.

One prior proposal set forth in U.S. Pat. No. 3,163,884 contemplates the provision of stunning tongs which can be forced against the animal's head by electrically operated mechanical means, but the actual stunning heads are such as to penetrate the animal's head. The purpose of penetration is to ensure good electrical contact with the flesh of the animal and effectively to grip the animal so that contact will not be lost if the animal moves. This is prior to passing the stunning impulse so that there is a time lag between application of the tongs and passing the stunning impulse so that the animal is aware of what is being done prior to stunning. Moreover, an extremely high and potentially dangerous, for a hand-operated apparatus, voltage range of 750-950 volts is comtemplated and such a voltage would in fact stimulate the animal's body so that it would be in a highly stiffened state during the stun which is unacceptable particularly for pigs.

Because of the skin penetration by the electrodes, the animal could move before the actual killing impulse is passsed, and any such movement of the animal would result in the animal being highly stressed in its nervous system and the skin of the head being damaged so that blood splashing will result.

In modern abattoirs pigs are placed in a restrainer which consists of a downwardly tapering trough which lifts the animal off its feet and then feeds it forward so that its head projects. The stunning is then carried out and the stunned animal is moved onto a table which it is immediately picked by its rear legs(s) and the animal's throat blood vessels severed over drip pans which collect the escaping blood. In this method there is a time delay of sufficient duration for the animal to react into tension before it is stunned.

OBJECTS AND SUMMARY OF PREFERRED FORMS OF INVENTION

The main object of the present invention is to provide improved stunning tongs and an improved stunning method in which the aforesaid disadvantages are reduced to an acceptable level while maintaining humane slaughter.

It is a particular object of the present invention to provide an improved stunning method and apparatus wherein a stunning impulse is first rapidly passed through the animal's head taking the animal unawares instantaneously to stun the animal temporarily and thereafter an electric stunning charge is imparted to the insensible animal through the animal's head sufficient to ensure complete and prolonged stunning of the animal until it is slaughtered immediately afterwards.

It is a further object of the present invention to provide an improved stunning method and apparatus wherein the animal is alive but unconscious when slaughter is effected by severing the throat blood vessels but where the animal is completely insensible at that time so that it will not suffer, while at the same time advantageously draining of blood is enhanced.

It is still another object of the present invention to provide such an improved stunning method and apparatus wherein the stunning heads employed present an area for pressure engaging the animal's head without penetration to effect a short stun leaving the animal in a relaxed state, and an impulse of predetermined waveform/frequency and voltage/current ensures complete stunning until the animal is slaughtered immediately afterwards.

Preferred forms of the invention intended to accomplish the foregoing and other objects include stunning tongs for stunning animals prior to slaughter comprising a frame having a handle portion and a pair of stunning arms mounted thereon to permit relative movement between the arms. Stunning electrode heads are on the arms, and a prime mover is operable to effect rapid relative movement between the arms to make firm contact without penetration on opposite sides of the animal's head and instantaneously with said contact to pass the stunning impulse through the animal's head and to follow this immediately with a steady stunning current to stun the animal for sufficient time to enable the animal to be slaughtered as by bleeding a pig. An electronic stunning device is operable in timed relation to the prime mover to pass an impulse of predetermined waveform/frequency and voltage/current for a predetermined time period between the stunning heads through the animal's head coterminuous with the engagement of the tongs with the animal's head.

Preferably one or both stunning arms is or are pivoted to the frame and the prime mover comprises a pressure fluid piston cylinder connected between the frame and the stunning arm or arms.

The prime mover may comprise a compressed air cylinder mounted on the frame with a piston therein having a piston rod articulated to at least one stuuning arm, the compressed air supply to the cylinder being controlled by a trigger and preferably incorporating means to adjust the pressure value.

The stunning heads preferably comprise electrodes electrically insulated from the arms and in circuit with means to discharge the impulse between the electrodes in timed relation with the actuation of the stunning arms.

The rapid movement of the stunning arms produces a surprise impace on the animal's head and coterminuous therewith the initial stunning impulse is passed through the animal's head followed without any time lag by a stunning charge, the resultant period of stun being sufficient to ensure complete stunning of the animal until it is slaughtered immediately afterwards. Immediately on stunning with the present invention, perferably within 6 to 8 seconds and without the animal regaining consciousness, the slaughter is effected by severing the throat blood vessels.

In the foregoing manner, employing the rapid stunning impulse followed by the stunning current to ensure complete stunning but not a killing of the animal, the animal is left in a completely relaxed, stunned state, thus enhancing blood flow after slaughtering while ensuring that the animal does not suffer.

Other objects and advantages of the present invention will become apparent from the subsequent description in connection with the accompanying drawings, in which:

DETAILED DESCRIPTION

Figure 1:
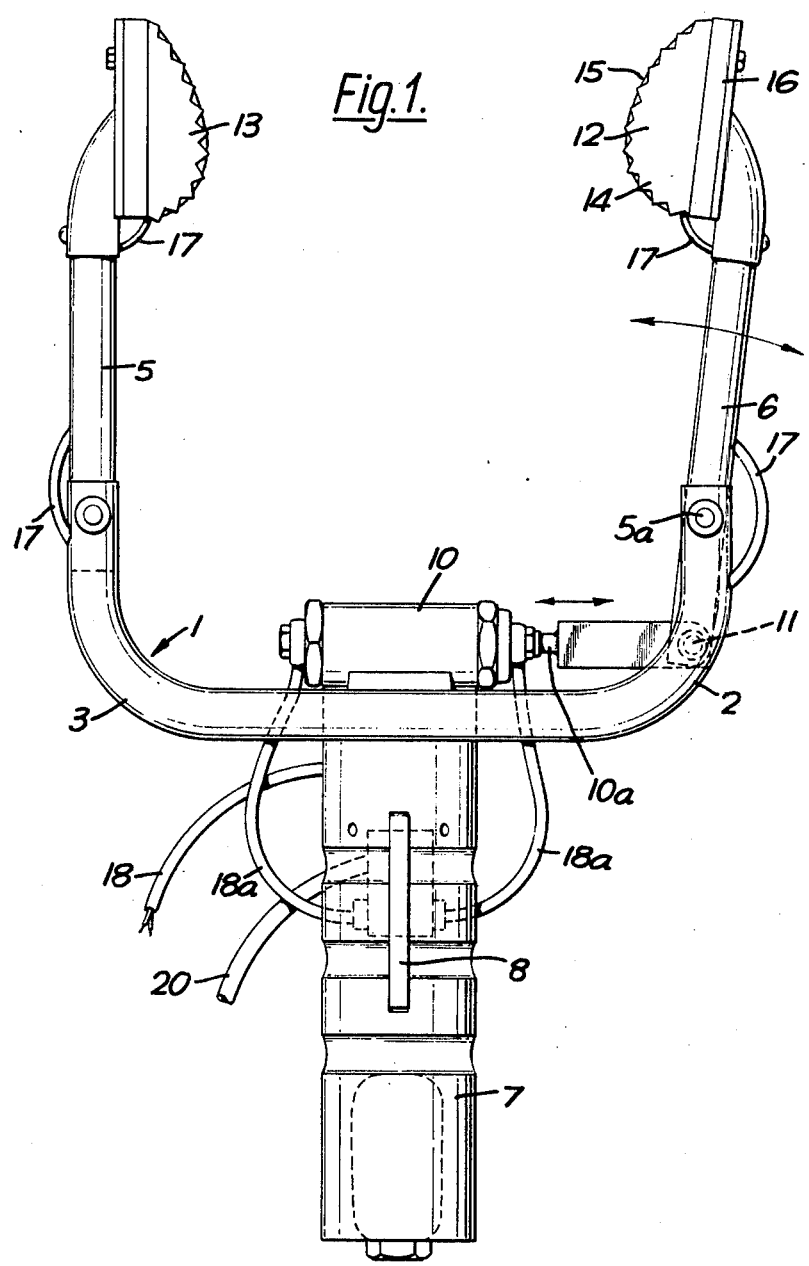
FIG. 1 is a elevation of a stunning tongs.
Figure 2:
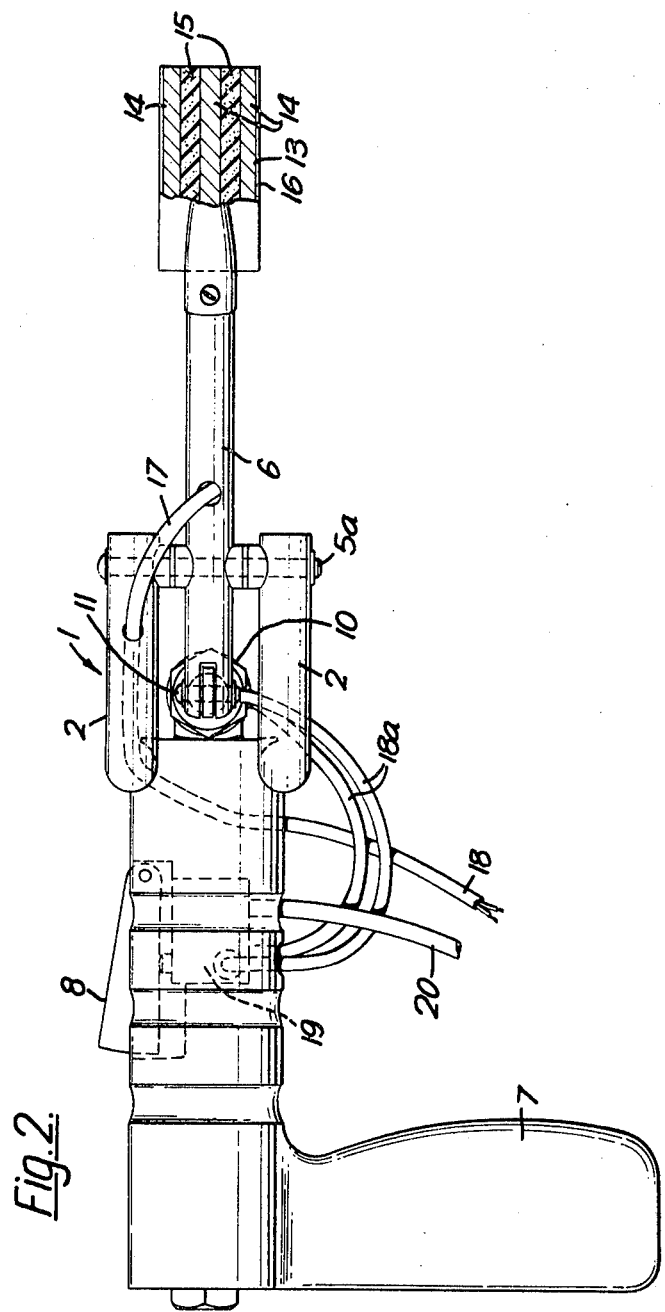
FIG. 2 is a side elevation looking from the right of FIG. 1.

Referring to FIGS. 1 and 2, the tongs comprises a U-shaped shaped frame 1 to the arms 2,3 of which stunning arms 5,6 are mounted. Any shape of frame may, however, be used. As shown, the arm 6 is pivoted at 5a to the arm 2 but both arms 5,6 may be pivoted to the arms 2,3 respectively, the essential requirement being that the outer ends of the arms 5,6 can be spread apart to permit an animal's head to be located freely between them and then moved rapidly to make firm contact on each side of the animal's head and instantaneously therewith to stun the animal so that the animal is wholly unaware of what occurs. The stun does not kill the animal and hence the heart continues to beat so that when the throat blood vessels are cut the blood is pumped out of the carcass while the nervous system remains relaxed.

The frame 1 is mounted on a handle 7 shown in FIG. 2 in the form of a pistol grip handle with a control trigger 8 pivoted thereto for operating the tongs as will be described.

Mounted on the frame-handle assembly is a prime mover shown as a pneumatic cylinder 10, the piston rod 10a of which is articulated at 11 to the arm 6 on the opposite side of the arm pivot 5a from the stunning head of the arm. The outer ends of the arms 5,6 carry stunning heads 12, 13, respectively, each formed of a number of rigid plates 14 of electrically conducting material separated by resilient foam pads 15, e.g. of rubber or plastics, the pads and plates being mounted on a base 16 of electrically insulating material, e.g. nylon or polytetrafluoroethylene, fixed to the arms 5,6. These heads form the electrodes of the tongs and are connected by leads 17 to a cable 18 from a source of an electric signal connected to the the handle-frame assembly and electrically insulated therefrom.

The cylinder 10 is connected through pressure fluid lines 18a to a valve 19 in the handle and actuated by the trigger 8. This valve is connected to a pressure fluid supply line 20. The air pressure fluid may be a gas, e.g. air or a liquid, e.g. hydraulic oil.

Alternatively the prime mover may be a solenoid device or a servo-motor.

The trigger 8 may actuate both the valve 19 and a switch in the leads 17 and may perform a dual function i.e. to cause the stunning arms to be rapidly and firmly engaged on the animal's head, and to actuate a switch to provide the impulse through the animal's head.

As will be appreciated with reference to FIGS. 1 and 2, the stunning heads 12 and 13 present an area configurated for pressure engaging the animal's head without penetration. The rigid plates 14 separated by the foam pads have a knurled-like periphery to aid in preventing slipping on the animal's head but, as will be apparent to one skilled in the art they will not penetrate the animal's head during operation.

Figure 3:
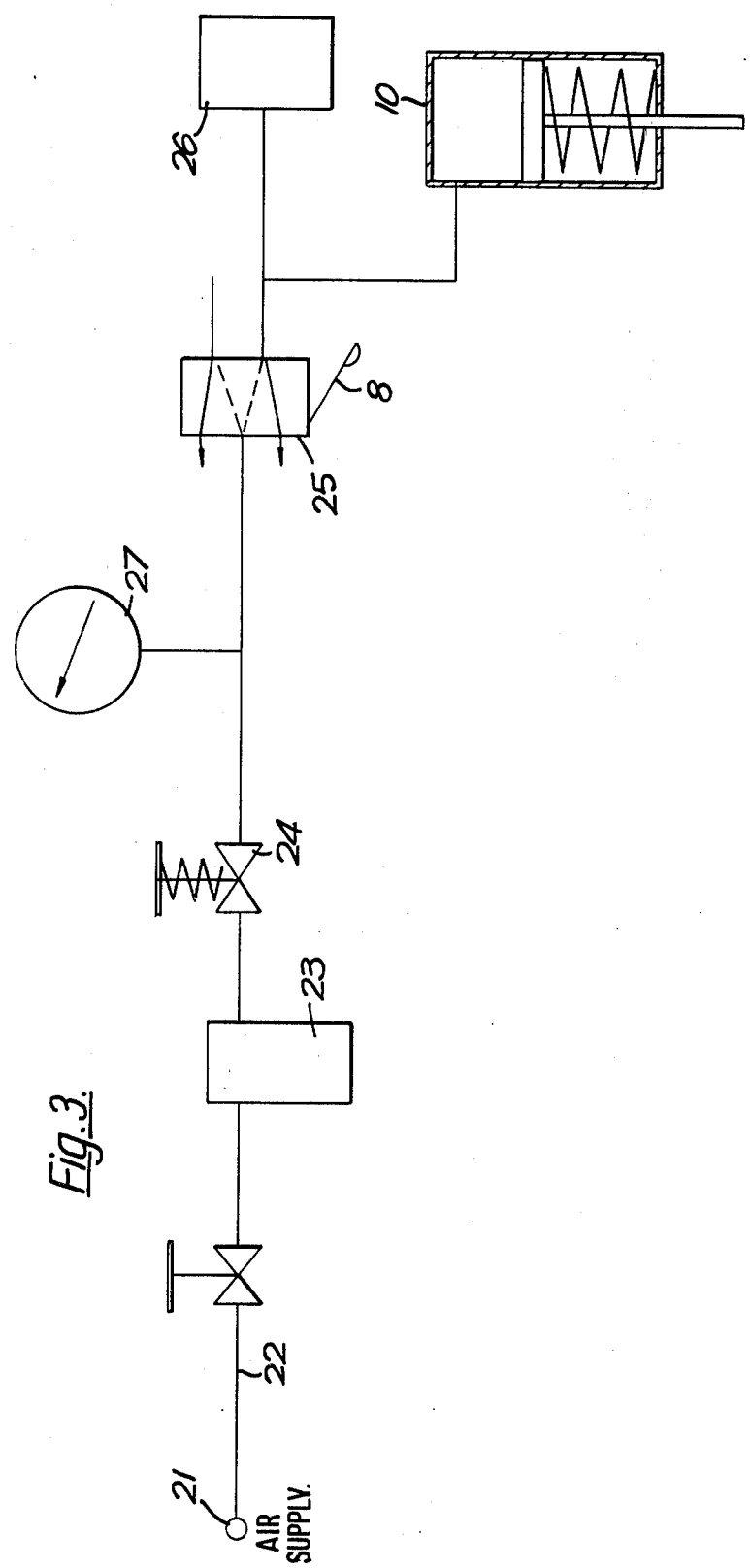
FIG. 3 is a line diagram of the pressure fluid circuit of the prime mover of the tongs; and,
FIG. 4 is a circuit diagram of the impulse generating means which energize the electrodes of the tongs.

Referring to FIG. 3, this shows the pressure fluid circuit for the prime mover cylinder 10, in which an air supply 21 of conventional form is connected by a pipe 22 through a filter 23, a pressure regulator 24 of conventional form and a lever operated control valve 25 to the cylinder 10 of the tongs. A pressure gauge 27 is provided in the circuit. By adjustment of the regulator 24 the air supply to the cylinder 10 and hence the actuation of the cylinder 10 can be controlled to provide the requisite snap action of the movement of the electrodes against the animal's head so that as soon as the animal's head projects from the restrainer the tongs immediately snap into position for the impulse to pass. The air pressure from the valve 25 is applied to a pressure switch 26 (i.e. the trigger 8 in FIGS. 1 and 2) which operates the electronic timer circuit which energizes a stunning impulse circuit described with reference to FIG. 4.

Figure 4:
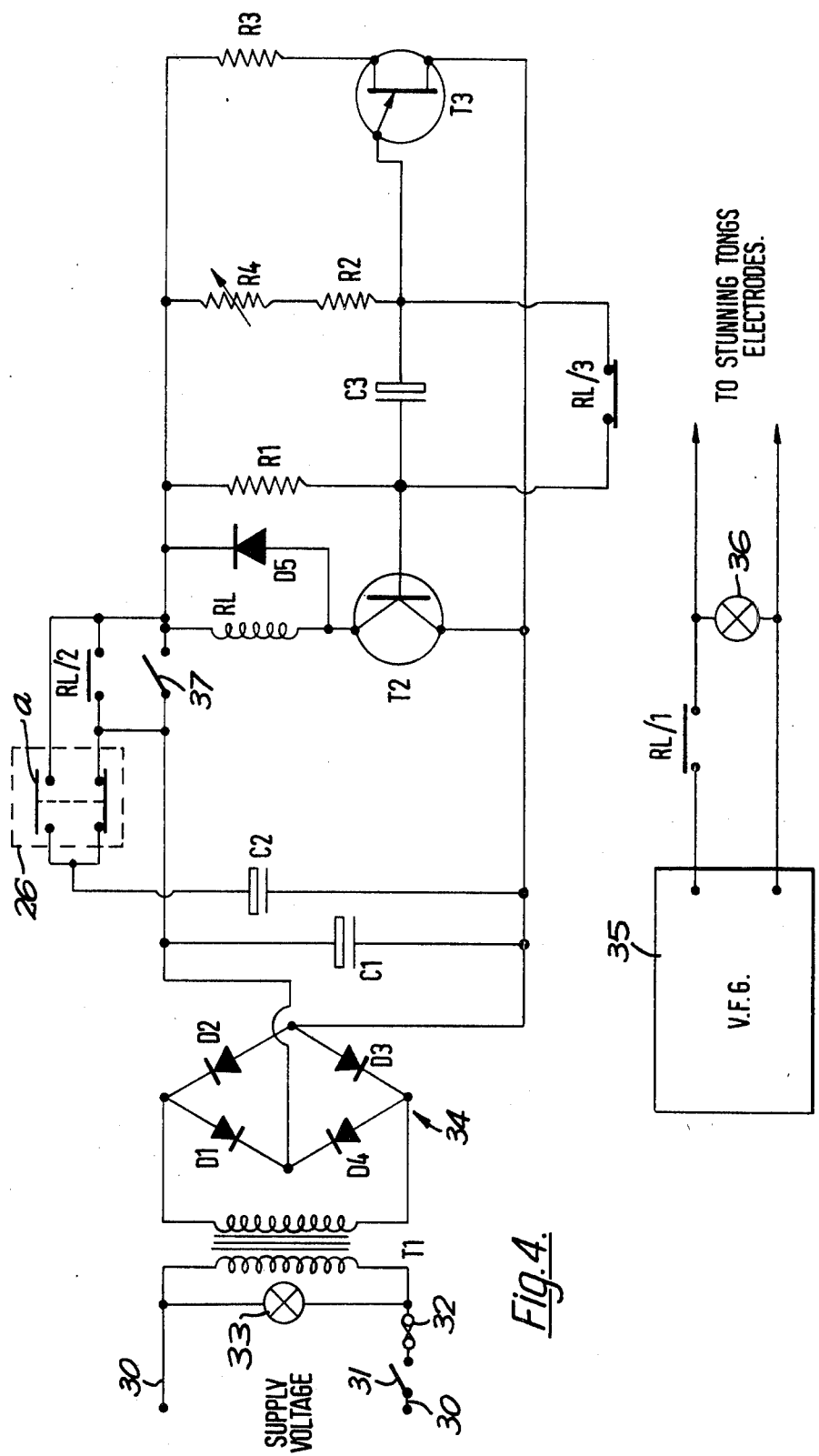

Referring to FIG. 4, the top portion shows the timing circuit and the bottom portion the impulse circuit. In the timing circuit an A.C. voltage is applied from the input 30 across the isolating switch 31 and fuse 32 to a transformer T1, the lamp 33 indicating that the circuit is live. The voltage is transformed down to 24 volts A.C. and then rectified by a diode bridge rectifier 34 having the four diodes D1, D2, D3, D4. The output voltage from the diode bridge is smoothed by a capacitor C1.

When the pressure switch 26 of FIG. 3 is not energized the circuit is dead and a capacitor C2 charges up and holds its charges; when the pressure switch 26 is operated, the charge on the capacitor C2 is transferred through a contact $a$ and a resistor R1 to the base of a transistor T2 which acts as a bias on T2, i.e. triggers it. Thus this voltage charge is sufficient to turn the transistor T2 ON and to energize a relay RL. T2 transistor is held ON via a relay RL/2 and the resistor R1 which are then energized. At this instant T2 is still ON, a capacitor C3 starts to charge via a variable resistor R4, the resistor R2 and the transistor T2 and thence back to the transformer T1 to give a supply voltage. When the capacitor C3 charges up to sufficient voltage, it turns ON the transistor T3, when the transistor T3 conducts heavily, the capacitor C3 discharges very quickly through the transistor T3, which in turn cuts the transistor T2 OFF because the bias at Junction R1 and base of T2 is grounded or taken down to negative potential in that part of the circuit. Then relay RL then de-energizes and the circuit is set into its original state before the pressure switch 26 is operated. When the relay RL is energized, contacts RL/1 of a relay in the AC circuit containing the tongs and electrodes and energized by a variable frequency/voltage generator 35, are made and this allows a voltage to be applied to the stunning tongs. A lamp 36 indicates that the electrodes circuit is live. The stunning time, i.e. the period of the contacts RL/1 being energized is adjustable from 0 to 60 seconds by adjusting the resistor R4. A stun lasting for 30 seconds has been successfully employed.

The timer circuit of FIG. 4 can be held on by an operating switch 37. Voltage is applied through the switch 37 and the resistor R1 to the base of the transistor T2 which is turned ON, thus energizing the relay RL and closing the contacts RL/1.

It will be understood, however, that any suitable timing circuit can be used providing it does actuate the contact RL/1 for the requisite stunning time.

By means of this timing circuit energizing the relay RL/1 in timed relation to the operation of the pressure circuit of FIG. 3, the electrode heads are energized through RL/1 before they strike the animal's head so that instantaneously on firm contact of the electrode heads on the animal's head an impulse passes through the animal's head due to the impedance of the latter. This impulse is initially at its highest voltage e.g. 115 volts A.C. and rapidly dies away for example to 100 volts and then continues as a steady current. Thus the initial impulse effects an electric stunning blow followed by a steady stunning current so long as RL/9 is held closed by the timing circuit of FIG. 4. This flow e.g. for 4–8 seconds ensures that after the tongs are removed from the animal's head, the animal will remain stunned for sufficient time normally about 1 minute for the animal to be slaughtered. This impedance of the animal's head varies from one animal to another due for example to the individual makeup of the animal's skin or the degree of moisture in the skin. The impedance can be varied if desired by spraying the animal with water before it enters the restrainer or while it is in the restrainer: this does not shock the animal into nervous tension since it is known that spraying animals such as pigs with water calms the animals.

A suitable stunning voltage is in the order of 150 volts A.C. but the device will operate in a frequency range of 20 cycles/second to 2 megacycles/second, a frequency of 1500 cycles/second often being used, and voltage 0–350 vac. The waveform of the voltage/current may be of square sinusoidal or impulse form.

Operation at a low voltage, for example 115 volts AC, with either of the electrode heads being approximately zero volts when earthed or grounded. However if both electrodes are touched simultaneously the full voltage is reached. The risk to the operator of a shock is minimized.

By means of the stunning tongs of the invention a crisp stun followed by a quick slaughter is achieved and the impulse followed by the steady voltage/current for an adequate time ensures the maintenance of a complete stun until the animal is slaughtered immediately afterwards.

Although the invention has been described with reference to preferred forms thereof, it will be appreciated by those skilled in the art that additions, substitutions, modifications and deletions may be made without departing from the spirit and scope of the invention as defined in the appended claims.

I claim:

1. A stunning tongs for stunning animals prior to slaughter comprising a frame, a handle portion mounted on said frame, a pair of stunning arms mounted on said frame for relative movement of at least one of said arms with respect to said frame, a stunning head on each of said arms, each of said stunning heads comprising a stunning electrode and presenting an area configured for pressure engagement of the head of an animal without penetration, a prime mover operably connected to said at least one arm to effect rapid relative closing movement between said arms to make rapid firm contact on opposite sides of said animal's head disposed between said arms, electronic stunning circuit means including timing means and connected to said electrodes for generating an impulse of predetermined waveform/frequency and voltage/current; an energizing means operably connected to both said prime mover and said stunning circuit means for energizing said prime mover and said stunning circuit means; manually actuable control means for actuating said energizing means to supply energy simultaneously to said prime mover and said electronic circuit means; said electronic stunning circuit means being operable in timed relation to said prime mover to energize the electrodes subsequent to activation of said control means but prior to engagement of the electrodes with the animal's head so that instantaneously with the contact of the electrode heads on the animal's head said impulse of predetermined waveform/frequency and voltage/current passes between said stunning heads through said animal's head, for a predetermined period, sufficient to ensure complete stunning until the animal is slaughtered immediately afterwards.

2. A stunning tongs according to claim 1 wherein at least one of said stunning arms is pivoted to said frame and said prime mover comprises a pressure fluid piston-cylinder device connected between said frame and said at least one pivoted stunning arm.

3. A stunning tongs according to claim 1 wherein said prime mover comprises a compressed air cylinder mounted on said frame with a piston therein, a piston rod operatively connected between said piston and said at least one pivoted stunning arm, said energizing means including a compressed air supply connected to said cylinder, said control means comprising a flow control device for said air supply and a trigger on said handle operable to actuate said flow control device, and means to adjust the pressure of said air flowing from said control device to said cylinder.

4. A stunning tongs according to claim 1 wherein said electrodes are electrically insulated from said stunning arms, said stunning circuit having discharge means to generate said impulse between said electrodes, and as the impulse fades to maintain a current flow through the animal's head for said predetermined period.

5. A stunning tongs according to claim 1 wherein said frame is U-shaped, said handle and said prime mover are secured to the base of said U-shaped frame, and said stunning arms are secured to the arms of said U-shaped frame.

6. A stunning tongs according to claim 1 wherein said handle is a pistol grip, and said control means including a trigger pivoted to said pistol grip.

7. A stunning stunning according to claim 1 wherein said control means includes a trigger pivoted to said handle portion, said energizing means material separated an energy supply line mounted on said handle and connected to said prime mover and a source of energy, said electronic stunning circuit including a connection to an electric power supply, said stunning circuit including a switch actuated by energy from said energizing means.

8. A stunning tongs according to claim 7 wherein said prime mover is a pressure fluid actuated piston-cylinder, said energy source comprising a source of pressure fluid; a fluid supply line is provided from said source of pressure fluid to said piston-cylinder device, said control means comprising a valve provided on said handle in said supply line.

9. A stunning tongs according to claim 7 wherein said electronic stunning circuit includes a transformer to transform the voltage of said electric power supply to a low voltage, e.g. 24 volts, a diode rectifier to rectify the electronic signal in said circuit, a capacitor capable of being charged by said smoothed signal to influence a relay in timed relation with the actuation of said stunning arms to permit transmission of the stunning impulse to the stunning arms.

10. A stunning tongs according to claim 1 wherein said stunning heads are formed of a number of plates of electrically conducting material separated by resilient elements of non-electrically conducting material and said plates and resilient elements are mounted on bases of electrically insulating material, and said plates are electrically connected to said stunning circuit.

11. A stunning tongs according to claim 1 wherein said prime mover is a solenoid, said energizing means comprises an electronic power source and an electric power supply circuit connected to said power source and said solenoid; and said control means comprising a switch device provided on said handle and operably connected to said last-named circuit.

12. A stunning tongs according to claim 1 wherein said prime mover is a fluid servomotor, said energizing means comprising a source of operating fluid, said control means comprising a valve in a fluid supply line operably connecting said fluid source with said servomotor and said stunning circuit.

13. A stunning tongs for stunning animals prior to slaughter comprising a frame, a handle portion mounted on said frame, a pair of stunning arms mounted on said frame for relative movement of at least one of said arms with respect to said frame, a stunning head comprising a stunning electrode on each of said arms, a prime mover operative to effect rapid relative movement between said arms to make rapid firm contact on opposite sides of an animal's head disposed between said arms, an electronic stunning device operable in timed relation to said prime mover so that instantaneously with the contact of the electrode heads with the animal's head, an impulse of predetermined waveform/frequency and voltage/current is passed between said stunning heads through the animal's head for a predetermined period sufficient to ensure complete stunning until the animal is slaughtered immediately afterwards, said stunning heads being formed of a number of plates of electrically conducting material separated by resilient elements of non-electrically conducting material, said plates and resilient elements being mounted on bases of electrically insulating material, and said plates being electrically connected to a source of electric power supply.

14. A stunning tongs for stunning animals prior to slaughter comprising a frame, a handle portion mounted on said frame, a pair of stunning arms mounted on said frame for relative movement of at least one of said arms with respect to said frame, a stunning head comprising a stunning electrode on each of said arms, a prime mover operative to effect rapid relative movement between said arms to make rapid firm contact on opposite sides of an animal's head disposed between said arms, and an electronic stunning device operable in timed relation to said prime mover so that instantaneously with the contact of the electronic heads with the animal's head an impulse of predetermined waveform/frequency and voltage/current is passed between the stunning heads through the animal's head for a predetermined period sufficient to ensure complete stunning until the animal is slaughtered immediately afterwards during stun, a trigger pivoted to said handle, a pressure supply line actuated by said trigger and connected to said prime mover and to a source of pressure, a switch mounted on said arms adjacent to said trigger and situated in an electronic circuit including a connection to an electric power supply and including a transformer to transform the voltage of said electric power supply to a low voltage, a diode rectifier to rectify the electronic signal in said circuit, a capacitor to smooth said electronic signal, and a second capacitor capable of being charged by said smoothed signal to influence a relay in timed relation with said prime mover.

15. A stunning tongs according to claim 1 wherein said stunning circuit includes an actuating switch connected to said energizing means, so that when said control means is activated, said switch is operated to actuate said stunning circuit.

16. A method for stunning animals prior to slaughter, said method ultilizing stunning tongs comprising a frame, a handle portion mounted on said frame, a pair of stunning arms mounted on said frame for relative movement of at least one of said arms with respect to said frame, a stunning head on each of said arms, each of said stunning heads comprising a stunning electrode and presenting an area configured for pressure engagement of the head of an animal without penetration, a prime mover connected to said at least one arm; electronic stunning circuit means connected to the electrodes; energizing means connected to said prime mover and said electronic stunning circuit means; and manually actuable control means connected to said energizing means; said method comprising the steps of:
positioning said arms on opposite sides of an animal's head;
actuating said control means to supply energy from said energizing means simultaneously to said electronic stunning circuit means and said prime mover to:
effect rapid relative closing movement between said arms to make rapid firm contact on opposite sides of the animal's head, and
prior to such contact, energize said electrodes so that instantaneously with the contact of the electrodes on the animal's head an impulse of predetermined waveform/frequency and voltage/current passes between said electrodes through said animal's head for a predetermined period, sufficient to ensure complete stunning, until the animal is slaughtered immediately afterwards.

* * * * *